(12) United States Patent
Fukuda

(10) Patent No.: US 8,699,792 B2
(45) Date of Patent: Apr. 15, 2014

(54) ERROR DIFFUSION PROCESSING CIRCUIT

(75) Inventor: Yohsuke Fukuda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 178 days.

(21) Appl. No.: 13/336,804

(22) Filed: Dec. 23, 2011

(65) Prior Publication Data

US 2012/0163713 A1  Jun. 28, 2012

(30) Foreign Application Priority Data

Dec. 27, 2010  (JP) .................................. 2010-290614

(51) Int. Cl.
  *G06K 9/00*  (2006.01)
(52) U.S. Cl.
  USPC ........................................................ 382/165
(58) Field of Classification Search
  USPC ......... 382/162, 165–167, 251, 270, 274–275; 358/3.03–3.06, 3.09, 3.1, 3.13–3.14, 358/3.16, 3.19, 3.22–3.23, 3.26
  See application file for complete search history.

(56) References Cited

U.S. PATENT DOCUMENTS

| | | | | |
|---|---|---|---|---|
| 5,333,262 A | * | 7/1994 | Ulichney | 382/237 |
| 5,535,020 A | * | 7/1996 | Ulichney | 358/3.13 |
| 6,172,773 B1 | * | 1/2001 | Ulichney | 358/3.13 |
| 7,251,060 B2 | * | 7/2007 | Tonami et al. | 358/3.16 |
| 7,502,140 B2 | * | 3/2009 | Yamamura | 358/1.9 |
| 7,561,307 B2 | * | 7/2009 | Yamakado | 358/3.1 |
| 2010/0023657 A1 | | 1/2010 | Fukuda et al. | |
| 2010/0138578 A1 | | 6/2010 | Fukuda | |

FOREIGN PATENT DOCUMENTS

| | | |
|---|---|---|
| JP | 2005-260399 | 9/2005 |
| JP | 3963260 | 6/2007 |

* cited by examiner

*Primary Examiner* — Jose Couso
(74) *Attorney, Agent, or Firm* — Cooper & Dunham LLP

(57) ABSTRACT

An error diffusion processing circuit includes a memory having a predetermined size in which (P−1)×M dithering threshold matrices in a predetermined size for each of the quantization thresholds and color components are pre-stored, and a quantization threshold selector configured to select (P−1) matrices for the color component of the target pixel data from the dithering threshold matrices stored in the memory, and read an element from the elements of the selected matrices in accordance with a pixel position of the target pixel data in the image data for output as the (P−1) quantization thresholds. P is an integer of 2 or more and M is a positive integer. The data size of the dithering threshold matrices is set to be equal to or less than a value obtained by dividing a size of the memory by the number of dithering threshold matrices.

5 Claims, 11 Drawing Sheets

WHEN M = 4

WHEN M = 2 AND K = 2

ERROR DIFFUSION PROCESSING CIRCUIT

CROSS REFERENCE TO RELATED APPLICATION

The present application is based on and claims priority from Japanese Patent Application No. 2010-290614, filed on Dec. 27, 2010, the disclosure of which is hereby incorporated by reference in its entirety.

BACKGROUND OF THE INVENTION

1. Field of the Invention

The present invention relates to an error diffusion processing circuit for an image processor such as a monochrome or color laser printer and a monochrome or digital color copier.

2. Description of the Prior Art

In prior art an image output/input system in which multi-valued image data are read with an input device as a scanner or a digital camera and output with an output device as a printer or a display is well known. In such a system the read multivalued (for example, 8-bit, 256 tones) data is subjected to pseudo tone processing using error diffusion to convert, using a predetermined quantization threshold, the data into quantized image data in the number of tones with which the output device can process. Quantization errors occur in the conversion of the original multivalued image data into quantized image data. The error diffusion is to diffuse the quantization errors into surrounding pixels and thereby reduce errors in the entire quantized image data. The use of dithering threshold matrices as the quantization thresholds has been proposed.

For example, Japanese Patent Publication No. 3963260 discloses an image processor which includes a threshold generator having threshold groups for determining different density areas to generate each threshold for multi-toned image data of one pixel, and a tone processor to convert the multi-toned image data into less toned quantized data by the error diffusion using the thresholds. The threshold groups correspond to the quantization thresholds above.

Moreover, Japanese Patent Application Publication No. 2005-260399 discloses an image processor which extracts the characteristic amount of image data tone-converted referring to a tone conversion table and changes a quantization threshold for use in the error diffusion on the basis of the extracted characteristic amount.

The image processors above include a memory in which a tone conversion table for each characteristic amount is pre-stored and selectively change the tone conversion table according to the characteristic amount of an image. Therefore, depending on subject image data, all of the tone conversion tables are not always used and the use of the tables is not efficient. Meanwhile, to increase the number of tone conversion tables, the size of the memory needs to be increased proportionally.

SUMMARY OF THE INVENTION

An object of the present invention is to provide an error diffusion processing circuit in which quantization thresholds for pixel data are more efficiently pre-stored in a memory.

According to one aspect of the present invention, an error diffusion processing circuit for generating corrected data by adding cumulative quantization error data to target pixel data of image data including a predetermined number M of color components, quantizing the corrected data by a predetermined number (P−1) of quantization thresholds to a P-valued quantized data, and calculating quantization error data on the basis of the corrected data and the quantized data, M being a positive integer, P being an integer of 2 or more, the circuit includes a memory having a predetermined size in which a number (P−1)×M of dithering threshold matrices in a predetermined size for each of the quantization thresholds and the color components are pre-stored, and a quantization threshold selector configured to select a number (P−1) of matrices for the color component of the target pixel data from the dithering threshold matrices stored in the memory, and read an element from the elements of the selected matrices in accordance with a pixel position of the target pixel data in the image data for output as the number (P−1) of quantization thresholds, wherein a data size of the dithering threshold matrices is set to be equal to or less than a value obtained by dividing a size of the memory by the number of dithering threshold matrices.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENT

Hereinafter, one embodiment of the present invention will be described in detail with reference to the accompanying drawings. Wherever possible, the same reference numbers will be used throughout the drawings to refer to the same or like parts.

First Embodiment

Figure 1:
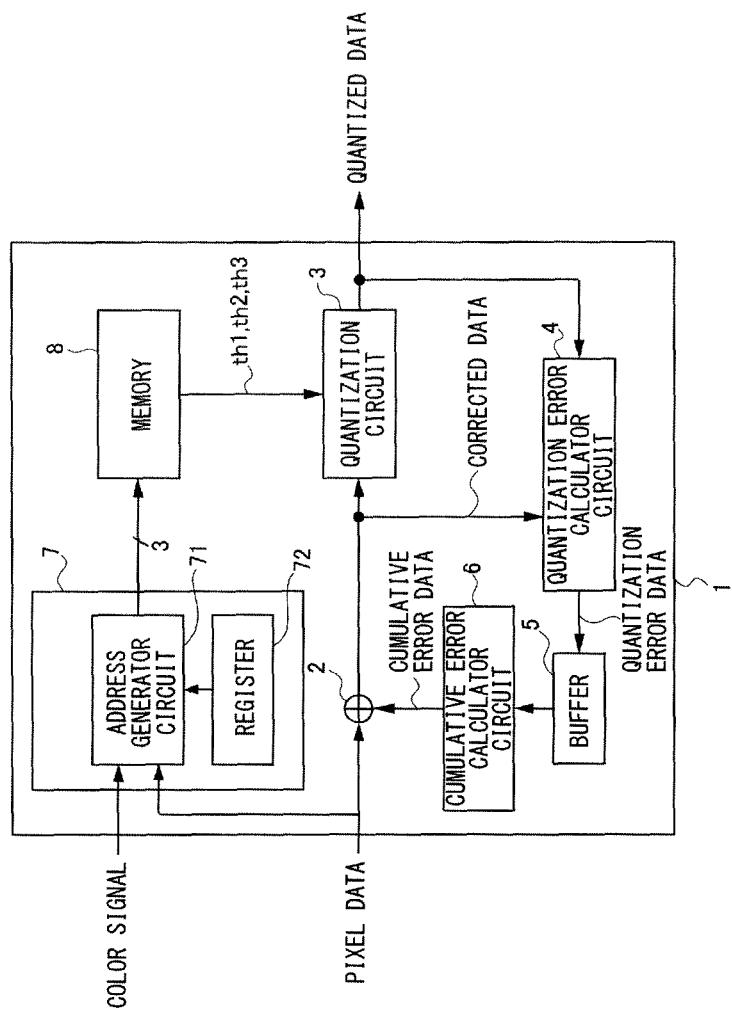
FIG. 1 is a block diagram of the structure of an error diffusion processing circuit 1 according to a first embodiment of the present invention.

FIG. 1 is a block diagram of an error diffusion processing circuit 1 according to the first embodiment of the present invention. The error diffusion processing circuit 1 is provided in an image processor such as a monochrome or color laser printer or a monochrome or color digital copier which processes multivalued (quinary or more) image data. The multivalued image data is subjected to error diffusion processing in sub scan direction and then each pixel data line constituting the processed multivalued image data is output in sequence to the error diffusion processing circuit 1. Receiving the pixel data and a color signal representing a color component of the target pixel data, the error diffusion processing circuit 1 subjects the pixel data to error diffusion processing and quantization in main scan direction to obtain quaternary quantized data and outputs it to another circuit in the image processor.

The error diffusion processing circuit 1 according to the present embodiment is configured to generate corrected data by adding cumulative quantization error data to target pixel data of image data including a predetermined number M (positive integer) of color components, quantize the corrected data by predetermined three quantization thresholds th1, th2, th3 to a four-valued quantized data, and calculate quantization error data on the basis of the corrected data. The circuit 1 includes a memory 8 having a predetermined size in which 3×M dithering threshold matrices in a predetermined size for each of the quantization thresholds and color components are pre-stored, and a quantization threshold selector 7 configured to select three matrices for the color component of the target pixel data from the dithering threshold matrices stored in the memory, and read an element from the elements of the selected matrices in accordance with a pixel position of the target pixel data in the image data for output as the three quantization thresholds th1, th2, th3. The data size of the dithering threshold matrices is set to be equal to or less than a value obtained by dividing the size of the memory by 3×M as the number of dithering threshold matrices.

The error diffusion processing circuit 1 in FIG. 1 includes an adder 2, a quantization circuit 3, a quantization error calculator circuit 4, a buffer 5, a cumulative error calculator circuit 6, a threshold selector circuit 7 including an address generator circuit 71 and a register 72, and a memory 8. Receiving cumulative error data from the cumulative error calculator circuit 6, the adder 2 adds the data to target pixel data to output a resultant as corrected data to the quantization circuit 3 and the quantization error calculator circuit 4. The quantization circuit 3 quantizes the corrected data to quantized data using three quantization thresholds th1, th2, th3 (th1<th2<th3) received from the memory 8 and outputs it to the quantization error calculator circuit 4 and another circuit in the image processor. The quantization error calculator circuit 4 subtracts the quantization error data from the quantization circuit 3 from the corrected data from the adder 2 and outputs a resultant to the buffer 5. The buffer 5 temporarily stores a predetermined amount of latest quantization error data and then outputs it to the cumulative error calculator circuit 6. The cumulative error calculator circuit 6 cumulatively adds a predetermined error diffusion coefficient as a weight to the quantization error data and outputs a resultant as cumulative error data to the adder 2.

The number M (positive integer) of color components of input pixel data is pre-stored in the register 72. The quantization thresholds th1, th2, th3 and dithering threshold matrices for generating the quantization thresholds th1, th2, th3 for each color component are pre-stored in the memory 8. In the present and subsequent embodiments the memory 8 has a fixed size, and the dithering threshold matrices are threshold tables which are referred to when input pixel data are quantized, and they are N-order square matrices (N being integer of 2 or more). Each element of the dithering threshold matrix corresponds to each pixel of image data and the quantization thresholds th1, th2, th3 vary in main and sub directions in an N-pixel cycle.

Figure 2:
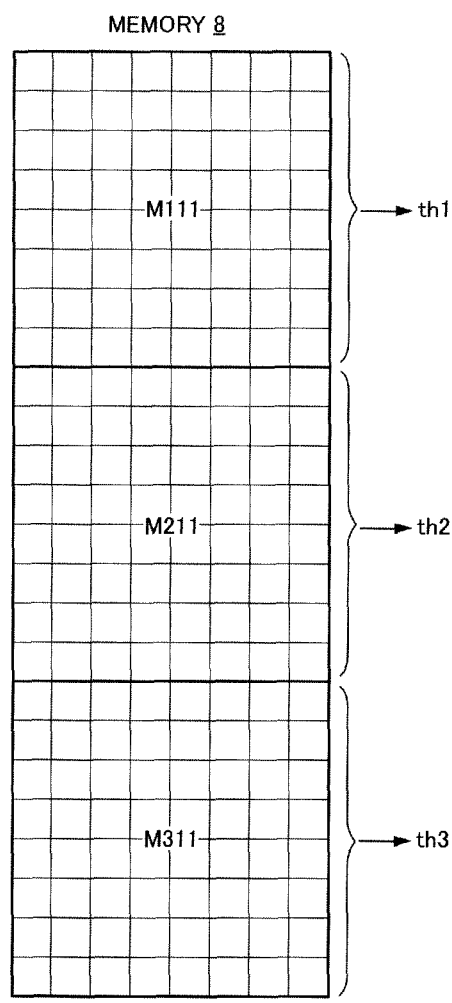
FIG. 2 shows the structure of a memory 8 in FIG. 1 when the number M of color components is one.

FIG. 2 shows the structure of the memory 8 in FIG. 1 when the number M of color components is one. At the number M being 1, the memory 8 contains three 8 by 8 dithering threshold matrix M111, M211, and M311 for generating the quantization thresholds th1, th2, th3 for pixel data of a first color component, respectively.

Figure 3:
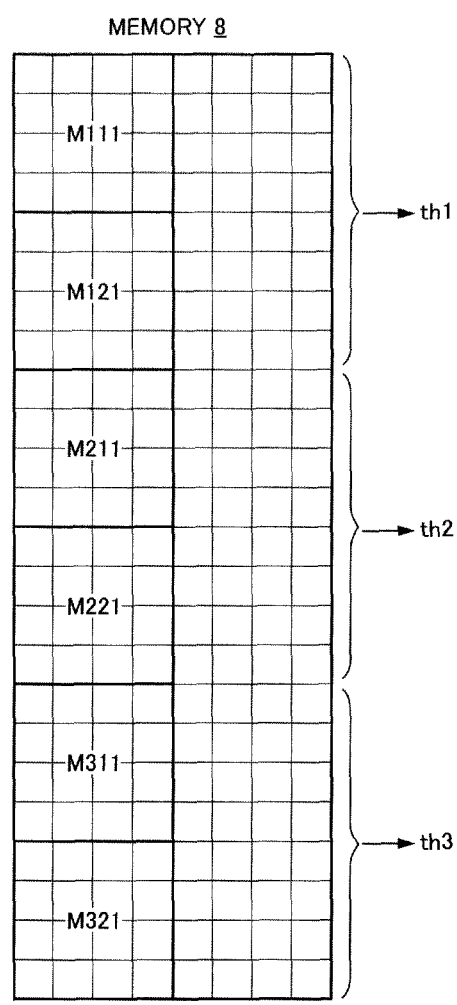
FIG. 3 shows the structure of the memory 8 in FIG. 1 when the number M of color components is two.

FIG. 3 shows the structure of the memory 8 in FIG. 1 when the number M of color components is two. At the number M being 2, the memory 8 contains two each 4 by 4 dithering threshold matrices M1$m$1, M2$m$1, and M3$m$1 for generating the quantization thresholds th1, th2, th3 for pixel data of the m-th (m=1, 2) color component, respectively.

Figure 4:
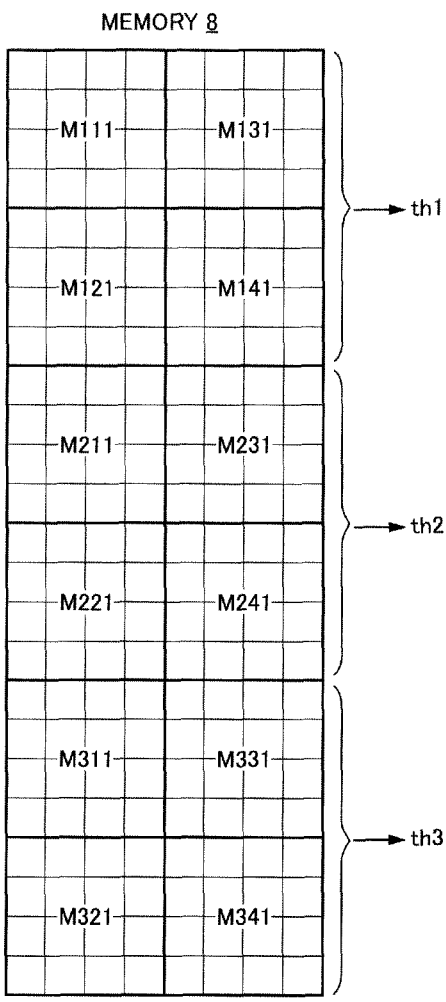
FIG. 4 shows the structure of the memory 8 in FIG. 1 when the number M of color components is four.

FIG. 4 shows the structure of the memory 8 in FIG. 1 when the number M of color components is four. At the number M being 4, the memory 8 contains four each 4 by 4 dithering threshold matrices M1$m$1, M2$m$1, and M3$m$1 for generating the quantization thresholds th1, th2, th3 for pixel data of the m-th (m=1, 2, 3, 4) color component, respectively.

FIG. 2 to FIG. 4 show example of the memory 8 when the number M of color components is 1, 2 or 4. However, the present invention should not be limited to such examples. For example, at the number of color components being M, it can be configured to include the number M of N by N dithering threshold matrices M1$m$1, M2$m$1, and M3$m$1 for generating the quantization thresholds th1, th2, th3 for pixel data of the m-th (m=1, 2, . . . , M) color component, respectively. The order N or size of each dithering threshold matrix is set to a data size equal to or lower than a value obtained by dividing the size of the memory 8 by 3×M as the number of dithering threshold matrices.

In FIG. 1 the address generator circuit 71 selects three dithering threshold matrices for generating the thresholds th1, th2, th3 on the basis of an input color signal and the number M of color components stored in the memory 8, and detects a pixel position of input image data in the dithering threshold matrices at timing at which target pixel data is input. Then, it generates an address signal indicating an address of the element of the selected dithering threshold matrices in association with each pixel position, and outputs it to the memory 8. Thus, the threshold selector circuit 7 reads the three quantization thresholds th1, th2, th3 from the memory 8 and outputs them to the quantization circuit 3.

As described above, according to the present embodiment, the order N of each dithering threshold matrix is set to a data size equal to or lower than a value obtained by dividing the size of the memory 8 by 3×M as the number of dithering threshold matrices. This makes it possible not to increase the size of the memory 8 along with an increase in the number M of color components of input pixel data and the number 3×M of dithering threshold matrices stored in the memory 8. Thus, the quantization thresholds can be more efficiently stored in the memory 8, compared with the prior art. In addition, the memory 8 as a part of the memory of the image processor does not vary in size, so that the memory area of the image processor other than the memory 8 can be more efficiently utilized.

Second Embodiment

Figure 5:
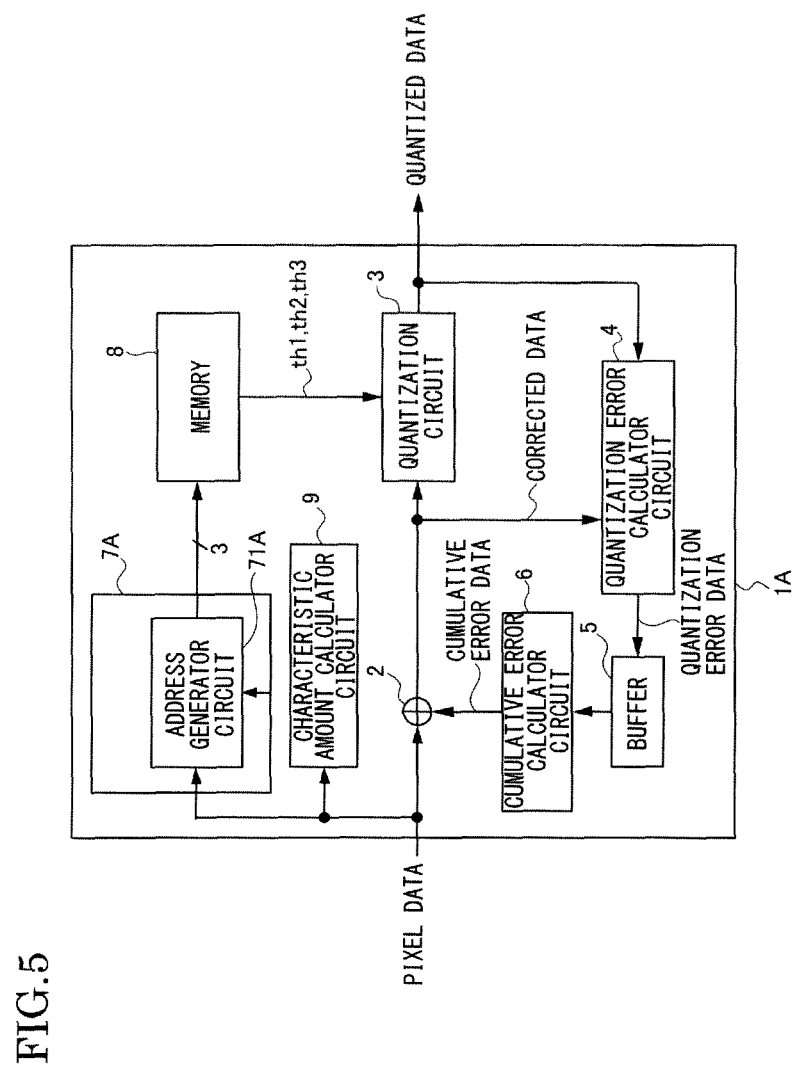
FIG. 5 is a block diagram of the structure of an error diffusion processing circuit 1A according to a second embodiment of the present invention.

FIG. 5 is a block diagram of the structure of an error diffusion processing circuit 1A according to a second embodiment. The error diffusion processing circuit 1A includes a threshold selector circuit 7A with an address generator circuit 71A and a characteristic amount calculator circuit 9 in replace of the threshold selector circuit 7 of the error diffusion processing circuit 1. The rest of the structure thereof is the same as that in the first embodiment.

The characteristic amount calculator circuit 9 is configured to calculate the first and second differentials of target image data as a characteristic amount which changes depending on the type of image data, on the basis of each pixel data constituting the image data. Then, it determines according to the calculated characteristic amount into which one of K types (K being integer of 2 or more) the image data is classified, and outputs a signal indicating the result and the number of types K to the address generator circuit 71A. At the number of types K being 2, for example, the characteristic amount calculator circuit 9 classifies the image data into a photo or a character, and at the number of types K being 3, it classifies the image data into a photo, halftone dots, or a character. At the number of types K being 8, it classifies the image data into one of eight types including a photo and a character.

Figure 6:
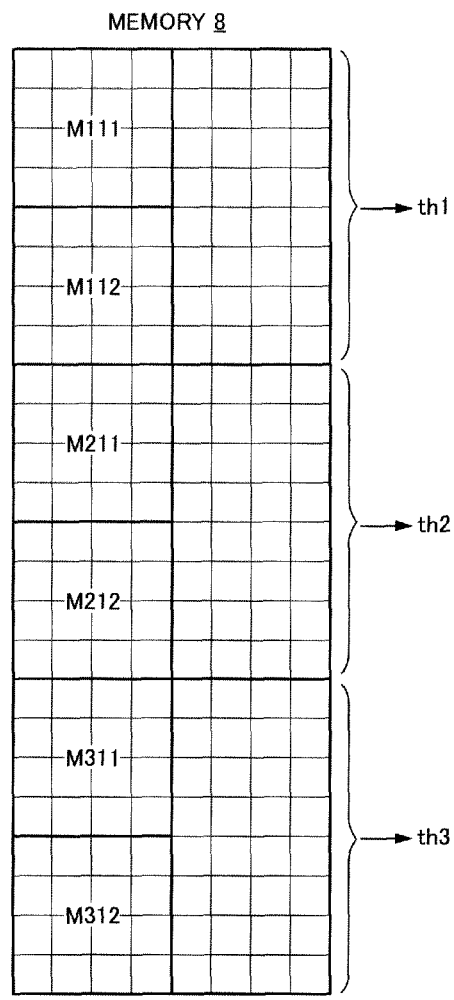
FIG. 6 shows the structure of a memory 8 in FIG. 5 when the number K of types of image data is 2.

In FIG. 5 the quantization thresholds th1, th2, th3 and dithering threshold matrices for generating the quantization thresholds th1, th2, th3 for each type of image data are pre-stored in the memory 8. FIG. 6 shows the structure of the memory 8 in FIG. 5 when the number K of types is 2. At the number K being 2, the memory 8 contains two each 4 by 4 dithering threshold matrices M11k, M21k, and M31k for generating the quantization thresholds th1, th2, th3 for pixel data of the k-th (k=1, 2) type, respectively.

Figure 7:
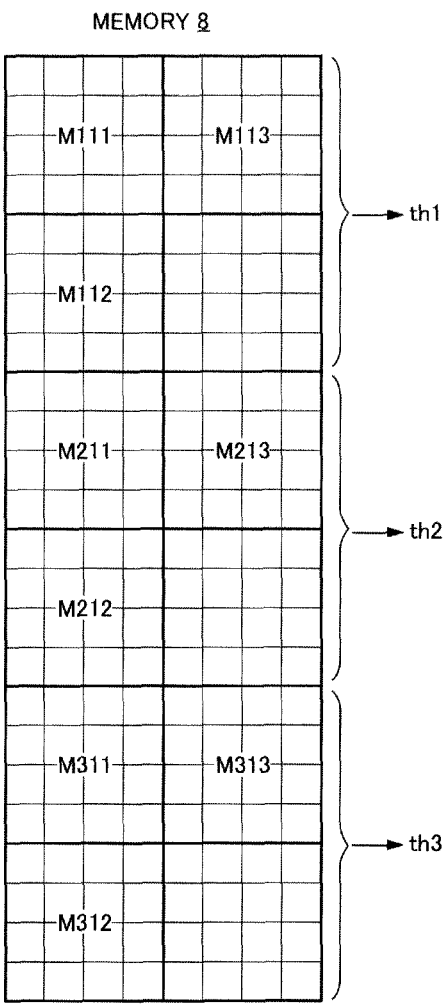
FIG. 7 shows the structure of the memory 8 in FIG. 5 when the number K of types of image data is 3.

Further, FIG. 7 shows the structure of the memory 8 in FIG. 5 when the number K of types is 3. At the number K being 3, the memory 8 contains three each 4 by 4 dithering threshold matrices M11k, M21k, and M31k for generating the quantization thresholds th1, th2, th3 for pixel data of the k-th (k=1, 2, 3) type, respectively.

Figure 8:
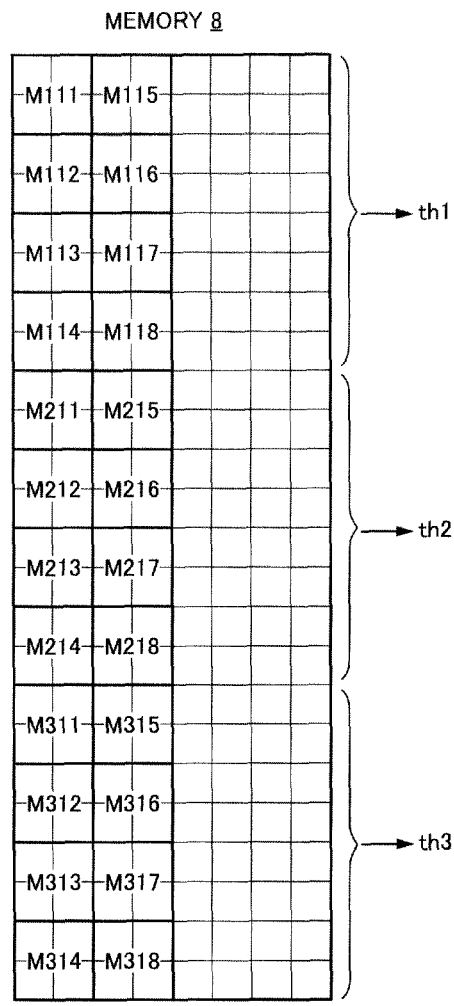
FIG. 8 shows the structure of the memory 8 in FIG. 5 when the number K of types of image data is 8.

FIG. 8 shows the structure of the memory 8 in FIG. 5 when the number K of types is 8. At the number K being 8, the memory 8 contains eight each 2 by 2 dithering threshold matrices M11k, M21k, and M31k for generating the quantization thresholds th1, th2, th3 for pixel data of the k-th (k=1, 2, . . . 8) type, respectively.

FIG. 6 to FIG. 8 show the examples of the memory 8 when the number K of types of image data is 2, 3, or 8. However, the present invention should not be limited to such examples. For example, at the number of types being K, it can be configured to include the number K of N by N dithering threshold matrices M11k, M21k, and M31k for generating the quantization thresholds th1, th2, th3 for pixel data of the k-th (k=1, 2 . . . , K) type, respectively.

The order N of each dithering threshold matrix is set to a data size equal to or lower than a value obtained by dividing the size of the memory 8 by 3×K as the number of dithering threshold matrices.

In FIG. 5 the address generator circuit 71A selects three dithering threshold matrices for generating the thresholds th1, th2, th3 on the basis of the number of types K and the classified type of target image data, and detects a pixel position of target pixel data in the dithering threshold matrices at timing at which the target pixel data is input. Then, it generates an address signal indicating an address of the element in association with each pixel position in the selected dithering threshold matrices, and outputs it to the memory 8. Thus, the threshold selector circuit 7A reads the three quantization thresholds th1, th2, th3 from the memory 8 and outputs them to the quantization circuit 3.

As described above, according to the present embodiment, the order of each dithering threshold matrix is set to a data size equal to or lower than a value obtained by dividing the size of the memory 8 by the number 3×K of dithering threshold matrices. This makes it possible not to increase the size of the memory 8 along with an increase in the number K of types of image data and the number 3×K of dithering threshold matrices stored in the memory 8. Thus, the quantization thresholds can be more efficiently stored in the memory 8, compared with the prior art. In addition, the memory 8 as a part of the memory of the image processor does not vary in size, so that the memory area of the image processor other than the memory 8 can be more efficiently utilized.

Third Embodiment

Figure 9:
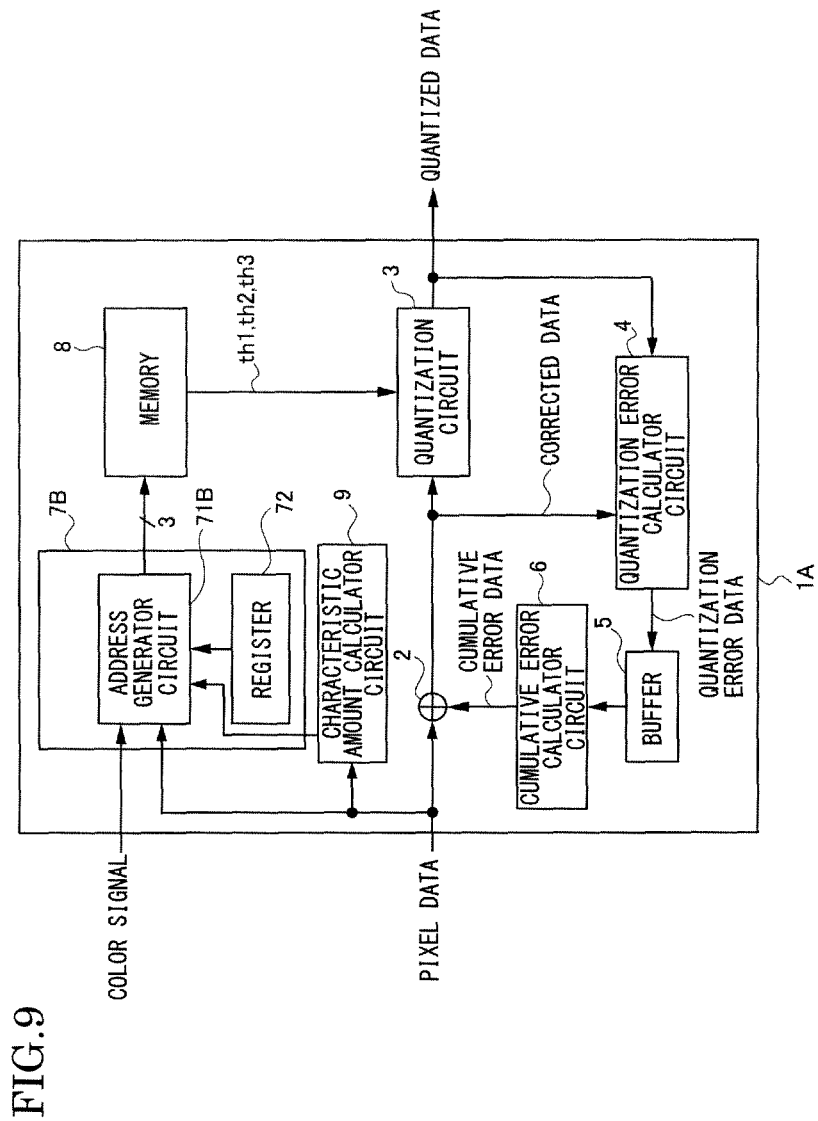
FIG. 9 is a block diagram of the structure of an error diffusion processing circuit 1B according to a third embodiment of the present invention.

FIG. 9 is a block diagram of the structure of an error diffusion processing circuit 1B according to a third embodiment. The error diffusion processing circuit 1B includes a threshold selector circuit 7B with an address generator circuit 71B and the register 72 and the characteristic amount calculator circuit 9 in FIG. 5 in replace of the threshold selector circuit 7 of the error diffusion processing circuit 1. The rest of the structure thereof is the same as that in the first embodiment.

As in the second embodiment, the characteristic amount calculator circuit 9 is configured to calculate the first and second differentials of target image data as a characteristic amount which changes depending on the type of image data, on the basis of each pixel data constituting the image data. Then, it determines according to the calculated characteristic amount into which one of the K types the image data is classified, and outputs a signal indicating the result and the number of types K to the address generator circuit 71B. Further, as in the first embodiment, the number M (M being positive integer) of color components of input pixel data is pre-stored in the register 72.

Figure 10:
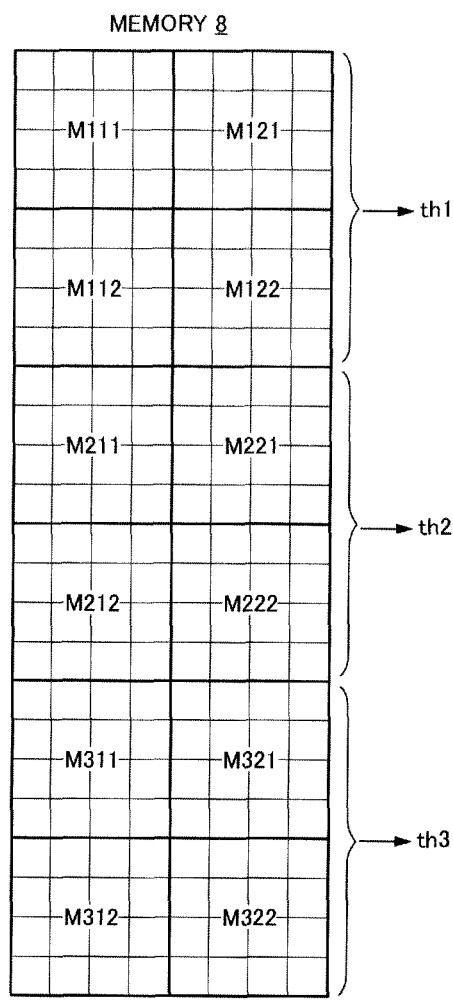
FIG. 10 shows the structure of a memory 8 in FIG. 9 when the number M of color components is 2 and the number K of types of image data is 2.

FIG. 10 shows the structure of the memory 8 in FIG. 9 when the number M of color components is 2 and the number K of types of image data is 2. At the number M and the number K being 2, the memory 8 contains four each 4 by 4 dithering threshold matrices M1mk, M2mk, and M3mk for generating the quantization thresholds th1, th2, th3 for pixel data of the m-th (m=1, 2) color component and k-th (k=1, 2) type, respectively.

Figure 11:
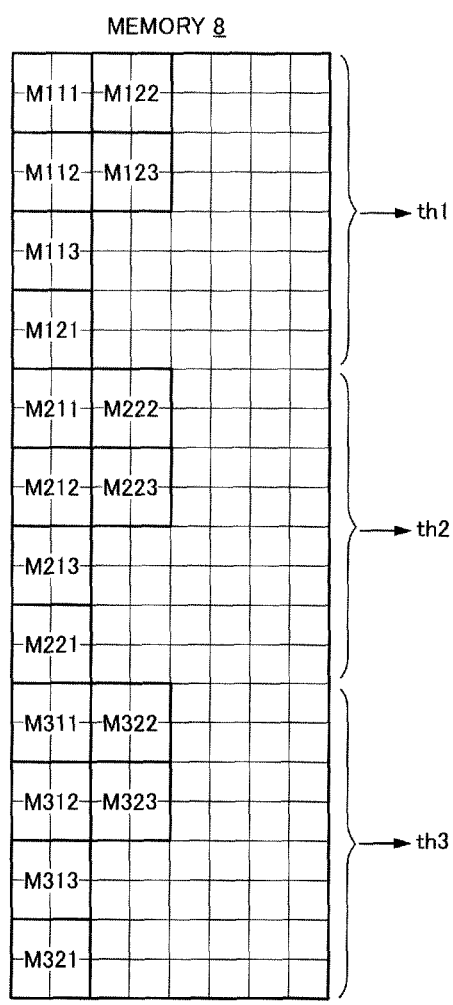
FIG. 11 shows the structure of the memory 8 in FIG. 9 when the number M of color components is 2 and the number K of types of image data is 3.

FIG. 11 shows the structure of the memory 8 in FIG. 9 when the number M of color components is 2 and the number K of types of image data is 3. At the number M being 2 and the number K being 3, the memory 8 contains six each 2 by 2 dithering threshold matrices M1mk, M2mk, and M3mk for generating the quantization thresholds th1, th2, th3 for pixel data of the m-th (m=1, 2) color component and k-th (k=1, 2, 3) type, respectively.

The number M of color components and the number K of types of image data can be arbitrarily decided. For example, at the number of color components being M and the number of types being K, it can be configured to include the number M×K of N by N dithering threshold matrices M1mk, M2mk, and M3mk for generating the quantization thresholds th1, th2, th3 for pixel data of the k-th (k=1, 2, . . . , K) type and the m-th (m=1, 2, . . . , M) color component, respectively.

The order N of each dithering threshold matrix is set to a data size equal to or lower than a value obtained by dividing the size of the memory 8 by 3×M×K as the number of dithering threshold matrices.

In FIG. 9 the address generator circuit 71B selects three dithering threshold matrices for generating the thresholds th1, th2, th3 on the basis of an input color signal, the number M of color components stored in the register, the number of types K and the classified type of target image data, and detects a pixel position of target pixel data in the dithering threshold matrices at timing at which the target pixel data is input. Then, it generates an address signal indicating an address of the element of the selected dithering threshold matrices in association with each pixel position, and outputs it to the memory 8. Thus, the threshold selector circuit 7 reads the three quantization thresholds th1, th2, th3 from the memory 8 and outputs them to the quantization circuit 3.

As described above, according to the present embodiment, the order of each dithering threshold matrix is set to a data size equal to or lower than a value obtained by dividing the size of the memory 8 by 3×M×K as the number of dithering threshold matrices. This makes it possible not to increase the size of the memory 8 along with an increase in the number K of types of image data and the number M of color components and the number 3×M×K of dithering threshold matrices stored in the memory 8. Thus, the quantization thresholds can be more efficiently stored in the memory 8, compared with the prior art. In addition, the memory 8 as a part of the memory of the image processor does not vary in size, so that the memory area of the image processor other than the memory 8 can be more efficiently utilized.

The above embodiments have examples where the quantization circuit 3 quantizes corrected data to quadrate quantized data using the three thresholds th1, th2, th3. However, the present invention is not limited to such examples. The corrected data can be quantized to binary or more quantized data P using the number (P−1) of thresholds th1, th2 . . . thP (P being integer of 2 or more). In this case the memory 8 contains the number (P−1)×M×K of dithering threshold matrices and the order N of each dithering threshold matrix is set to a data size equal to or lower than a value obtained by dividing the size of the memory 8 by (P−1)×M×K as the number of dithering threshold matrices.

Further, the above embodiments have examples where each dithering threshold matrix stored in the threshold table is an N-th order square matrix. However, the present invention is not limited to such examples. Alternatively, each dithering threshold matrix can be a N1 by N2 matrix where N1 and N2 are different positive integers and either thereof is 2 or more.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is clamed is:

1. An error diffusion processing circuit comprising:
    an adder circuit that adds cumulative quantization error data to target pixel data of image data including a predetermined number M of color components, to generate corrected data, M being a positive integer;
    a quantization circuit that quantizes the corrected data by a predetermined number (P−1) of quantization thresholds to a P-valued quantized data, P being an integer of 2 or more;
    a quantization error calculation circuit that calculates quantization error data on the basis of the corrected data and the quantized data;
    a memory having a predetermined size in which a number (P−1)×M of dithering threshold matrices in a predetermined size for each of the quantization thresholds and the color components are pre-stored; and
    a quantization threshold selector configured to select a number (P−1) of matrices for the color component of the target pixel data from the dithering threshold matrices stored in the memory, and read an element from elements of the selected matrices in accordance with a pixel position of the target pixel data in the image data for output as the number (P−1) of quantization thresholds, wherein
    a data size of the dithering threshold matrices is set to be equal to or less than a value obtained by dividing a size of the memory by the number of dithering threshold matrices.

2. An error diffusion processing circuit according to claim 1, further comprising
    a characteristic amount calculator configured to calculate a characteristic amount of the image data which varies with a type of the image data and classify the image data into one of K types of image data, K being an integer of 2 or more, wherein
    a number (P−1)×M×K of dithering threshold matrices in a predetermined size are pre-stored for each of the quantization thresholds, the color components, and the types of image data in the memory; and
    the quantization threshold selector is configured to select the number (P−1) of dithering threshold matrices in accordance with the color component of the target pixel data and the type of image data classified by the characteristic amount calculator.

3. An error diffusion processing circuit according to claim 2, wherein the characteristic amount is a first differential and a second differential of the image data.

4. An error diffusion processing circuit according to claim 2, wherein the K types of image data include a photo and a character.

5. An error diffusion processing circuit according to claim 1, wherein each dithering threshold matrix is a square matrix.

\* \* \* \* \*